United States Patent
Greb et al.

(10) Patent No.: US 11,313,465 B2
(45) Date of Patent: Apr. 26, 2022

(54) PARKING LOCK DEVICE FOR BLOCKING A ROTATIONAL MOVEMENT IN A DRIVE OF A MOTOR VEHICLE

(71) Applicant: Schaeffler Technologies AG & Co. KG, Herzogenaurach (DE)

(72) Inventors: Peter Greb, Ottersweier (DE); Laszlo Man, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/040,781

(22) PCT Filed: Mar. 21, 2019

(86) PCT No.: PCT/DE2019/100271
§ 371 (c)(1),
(2) Date: Sep. 23, 2020

(87) PCT Pub. No.: WO2019/192653
PCT Pub. Date: Oct. 10, 2019

(65) Prior Publication Data
US 2021/0010593 A1    Jan. 14, 2021

(30) Foreign Application Priority Data

Apr. 6, 2018 (DE) .......................... 102018108183.9

(51) Int. Cl.
*F16H 63/34* (2006.01)
*B60T 1/00* (2006.01)

(52) U.S. Cl.
CPC .......... *F16H 63/3433* (2013.01); *B60T 1/005* (2013.01)

(58) Field of Classification Search
CPC ...... F16H 63/34; F16H 63/3433; B60T 1/005; B60T 1/062
See application file for complete search history.

(56) References Cited

U.S. PATENT DOCUMENTS

2017/0299055 A1* 10/2017 Tomita ................ F16H 63/3433
2019/0017599 A1* 1/2019 List ...................... F16H 63/3433

FOREIGN PATENT DOCUMENTS

CN         205226353 U    5/2016
CN         105650273 A    6/2016

(Continued)

*Primary Examiner* — Ernesto A Suarez
*Assistant Examiner* — Lori Wu
(74) *Attorney, Agent, or Firm* — Matthew Evans

(57) ABSTRACT

A parking lock device includes a parking lock gear, a parking lock pawl, a control contour, and a contour following element for bearing against the control contour. The parking lock gear includes radially extending teeth with tooth gaps lying therebetween. The parking lock pawl has a portion arranged for radially engaging into one of the tooth gaps for blocking rotational movement of the parking lock gear. The control contour has a section extending in a rotational direction of the parking lock gear in a manner which differs from a circular path. During relative rotational movement between the parking lock gear and the parking lock pawl, the contour following element rotates relative to and bears against the control contour, forcing the contour following element to move the parking lock pawl with a radially inwardly directed movement component, deeply engaging the parking lock pawl in one of the tooth gaps.

7 Claims, 3 Drawing Sheets

(56) References Cited

FOREIGN PATENT DOCUMENTS

| | | |
|---|---|---|
| CN | 106347115 A | 1/2017 |
| DE | 102013106303 A1 | 12/2014 |
| DE | 102017125183 A1 | 5/2019 |

* cited by examiner

PARKING LOCK DEVICE FOR BLOCKING A ROTATIONAL MOVEMENT IN A DRIVE OF A MOTOR VEHICLE

CROSS-REFERENCE TO RELATED APPLICATIONS

This application is the United States National Phase of PCT Appln. No. PCT/DE2019/100271 filed Mar. 21, 2019, which claims priority to German Application No. DE102018108183.9 filed Apr. 6, 2018, the entire disclosures of which are incorporated by reference herein.

TECHNICAL FIELD

The disclosure relates to a parking lock device for blocking a rotational movement in a drive of a motor vehicle. The disclosure further relates to a drive arrangement for a motor vehicle with at least one parking lock device according to the disclosure.

BACKGROUND

A lock gear for a parking lock device for blocking a rotational movement in a drive of a motor vehicle is known from the prior art. DE102017125183.9 describes a lock gear with an external toothing having a plurality of radially extending teeth. A respective tooth head of a tooth is designed such that the center of the tooth head is located on a crown circle diameter. Furthermore, a respective tooth in the circumferential direction of the lock gear has a projection, at least on one side, which is arranged on a projection diameter that is larger than the crown circle diameter. A lock pawl resting on the lock gear is accelerated radially outward by the projection when the lock gear rotates. This allows the pawl to dip less deeply into the tooth gap, which can reduce vibration, noise and wear.

If the parking lock is activated at high speeds, for example due to misuse or incorrect operation, the lock pawl is rejected by the tooth flanks of the parking lock gear. However, the more the speed is reduced, the deeper the pawl dips into the respective tooth gap of the lock gear and must be thrown back out of this position. The resulting deflection impact creates unnecessary vibrations, noise and wear.

SUMMARY

The present disclosure provides a parking lock device that combines a long service life and low noise emissions.

The features may be combined in any technically useful way, including the explanations given in the following description and features of the figures which include additional embodiments of the disclosure.

The disclosure relates to a parking lock device for blocking a rotational movement in a drive of a motor vehicle, including a parking lock gear rotatable about a rotational axis, and a parking lock pawl. The parking lock gear includes an external toothing with a plurality of radially extending teeth and tooth gaps therebetween. The parking lock pawl is suitable, at least in certain regions, for engaging radially in a tooth gap of the parking lock gear in order to block a rotational movement of the parking lock gear. Furthermore, the parking lock pawl may be rotatably mounted.

The parking lock device includes a control contour and a contour following element for bearing against the control contour. The control contour is mechanically connected to one of the two components of the parking lock gear and the parking lock pawl or is formed as an integral part of this component. The contour following element is mechanically connected to the other component. In this sense, a mechanical connection is understood to mean that the control contour and/or the contour following element may be directly or indirectly mechanically connected.

The control contour also has at least one section which, in a first direction of rotation of the parking lock gear, differs from a circular path which runs coaxially to the rotational axis to the side facing radially away from the respective component to which the contour following element is connected. The contour of the control contour thus runs increasingly radially inward, at least in regions. It thus has, at least in regions, a section which, when it differs from an ideal circular path, increasingly runs in the direction of the rotational axis.

In the case of a relative rotational movement between the parking lock gear and the parking lock pawl and the associated relative rotational movement between the contour following element and the control contour and bearing of the contour following element against the control contour, the control contour forces the contour following element and thus the lock pawl to move with a radially inwardly directed movement component. The contour following element bears against the control contour and follows it increasingly radially inwardly in the movement thereof. This then causes the lock pawl to dip deeply in a tooth gap of the lock gear. The bearing of the contour following element against the control contour takes place on the radial side, which faces away from the component to which the contour following element is connected.

By the contour following element bearing against the control contour and guiding the contour following element on the control contour in the event of a relative rotational movement between the parking lock gear and the parking lock pawl, the locking pawl is forced to dip into the lock gear and the lock gear is thus locked.

The radial position of the contour following element is determined indirectly via the radial position of the lock pawl, since the contour following element is mechanically connected to the lock pawl by means of the connecting element disposed thereby.

When the lock is actuated by the vehicle user, the lock pawl experiences a force with at least one component directed radially inwardly.

In the case of a relative rotational movement between the parking lock gear and the parking lock pawl, the movement of the lock pawl due to the radially inward force component thus increasingly reduces the radius of the ideal circular path on which it moves after leaving a tooth head that it bears against.

The movement of the lock pawl can be divided substantially into two movement paths according to the disclosure, taking into account what has been explained above. The lock pawl either moves along a first movement path or it moves along a second movement path.

During the course along the first movement path, the contour following element is located with the intended region thereof adjacent to the control contour, at least at the time of an angle of 0° between the angular positions of the radially outermost point of the control contour and the contour following element, on an ideal circular path that has a smaller radius than the ideal circular path on which the radially outermost point of the control contour is located. As a result, the contour following element is placed on the control contour on the radial inside thereof and thus follows it along the radially inward section of the contour, whereby the lock pawl attached to the contour following element can be pulled into a tooth gap.

During the course along the second movement path, the contour following element is located with the intended region thereof adjacent to the control contour, at least at the time of an angle of 0° between the angular positions of the radially outermost point of the control contour and the contour following element, on an ideal circular path that has a larger radius than the ideal circular path on which the radially outermost point of the control contour is located. As a result, the contour following element is not placed on the control contour, which means that the lock pawl is not forced directly into the tooth gap and the lock pawl, and jumping over the tooth gap, ends up on the tooth head of the subsequent tooth without having to be rejected from a partially dipped position.

The decisive factor for the movement path of the lock pawl is the relative speed between the lock pawl and the lock gear. The speed that marks the transition for the two movement paths is what is termed the deflection speed. If the relative speed reaches or exceeds the limit value, which is the deflection speed, the lock pawl moves on a second movement path, so the contour following element does not bear against the control contour and therefore no lock pawls dip into a tooth gap. Accordingly, a first movement path is realized below the deflection speed and the lock gear is locked. The deflection speed corresponds to a defined rotational speed of a rotating element in the drive train.

According to a further aspect, the disclosure relates to an arrangement of the control contour on the parking lock gear and an arrangement of the contour following element on the lock pawl. Alternatively, a reversed arrangement can also be realized, in which the control contour is then arranged on the lock pawl and the contour following element on the lock gear. The arrangement of the parking lock pawl or the parking lock gear on the respective components can also be implemented indirectly.

In addition to what has been described above, a further aspect of the disclosure relates to a connecting element. The contour following element includes a connecting element that produces the connection between the contour following element and the lock pawl. Alternatively, the contour following element itself can form a connecting element.

Furthermore, the contour following element can include a driving element. The driving element is formed by the contour following element in such a way that it realizes the means of connecting the contour following element and the control contour. The driving element can essentially be seen as a cylindrical attachment, which is formed on the side of the contour following unit facing the lock gear in such a way that it faces the lock gear with the flat surface thereof, wherein the lateral surface thereof is consequently formed to be parallel to the surface of the control contour. The connecting element may be located in a region of the contour following element facing the lock pawl and the driving element is located in a region of the contour following element facing the lock gear.

In a further embodiment of the disclosure, the parking lock device has a control ramp and a suspension and/or a sprung guide of the contour following element. The control ramp extends in the axial direction positioned upstream of the control contour in the direction of rotation. In an example embodiment, the control contour directly adjoins the control ramp along the direction of rotation. By means of the suspension and the control ramp, a movement path of the lock pawl can be realized, on which the lock pawl initially slides from a tooth head that it bears against when the lock gear rotates and then does not dip into a tooth gap. The contour following element passes over the control ramp and is guided resiliently away from the lock gear to the outside axially. Here, the contour following unit is not gripped by the control contour, and the parking lock pawl connected to the control contour can follow the movement thereof unaffected. The parking lock pawl thus jumps over the tooth gap without dipping thereinto. The control contour and the control ramp can form a common component, which can also be referred to as a control element.

Furthermore, a resilient arrangement of the connecting element on the parking lock pawl can be realized. In this embodiment, the contour following element may be firmly connected to the connecting element. Alternatively, a suspension of the contour following element itself can be realized. The contour following element can be designed, for example, as a leaf spring.

In another embodiment of the parking lock device according to the disclosure, the parking lock pawl is rotatably mounted. The lock pawl has a lock pawl bearing. This means that the dipping movement of the parking lock pawl to implement the radial engagement in a tooth gap of the parking lock gear is a rotational movement. Alternatively, the lock pawl can also be mounted in a rail or guide and can be locked by means of a translational locking movement.

According to a further aspect of the disclosure, the parking lock device has a control contour and a contour following element axially on both sides of the parking lock gear. The radially differing sections of the respective control contours arranged on the two axially opposite sides of the parking lock gear extend in opposite directions of rotation.

This embodiment serves to lock the parking lock gear when it rotates in opposite directions of rotation, for example, during a rotation for realizing a forward gear of a motor vehicle and the rotation for realizing a reverse gear of the motor vehicle.

In another embodiment of the disclosure, a control element includes the control contour and a control ramp. The control ramp is designed such that the longitudinal direction of extension thereof lies parallel to a tangent to an ideal circle coaxial to the rotational axis, and the control ramp increasingly moves away from the plane of extent of the parking lock gear as it extends in the longitudinal direction thereof.

Furthermore, the control element can include a control platform, which has a surface that lies parallel to the plane of extent of the parking lock gear, which adjoins the control ramp at the end of the longitudinal direction of extent. The control contour is part of the control element such that it is designed as a radially inner side wall of the control ramp or of the control ramp and the control platform. The control ramp or the control ramp and the control platform can be passed over by the contour following element in such a way that the movement of the lock pawl in the movement path in which it is moving is unaffected. The lock pawl jumps over a tooth gap and continues to slide on the next tooth head.

When the control ramps are arranged on the control contours, these control ramps are also upstream corresponding with the opposite directions of rotation of the control contour. This means that when the control contours are arranged on the parking lock gear on a first axial side of the parking lock gear, a first control contour extends radially inwardly in a clockwise direction and the control ramp is connected to the control contour in a counterclockwise direction. In this way, the parking lock pawl can be pulled into the toothing or the tooth gaps of the parking lock gear when the parking lock gear rotates counterclockwise relative to the parking lock pawl.

On the axially opposite, second side of the parking lock gear, a correspondingly designed control contour and control ramp are provided, which have an opposite orientation, so that when the parking lock gear rotates clockwise relative to the parking lock pawl, the parking lock pawl can be pulled into the toothing or the tooth gaps of the parking lock gear.

The teeth of the external toothing may be designed such that the center of the tooth head is on a crown circle diameter. A respective tooth has a projection in the circumferential direction of the lock gear on at least one side, which is arranged on a projection diameter that is larger than the crown circle diameter, so that a lock pawl bearing against the lock gear can be accelerated radially outwardly by the projection when the lock gear rotates. The teeth of the external toothing are arranged, as is usual, to extend radially outwardly. A respective tooth head is the region of the tooth that is delimited in the circumferential direction by tooth flanks and has a larger diameter than the tooth base.

The center of each tooth head is the region that is located centrally between the two tooth flanks delimiting the respective tooth head. At least this region lies on the crown circle diameter. The higher the angular speed of the lock gear, the higher the acceleration the lock pawl bearing against the external toothing experiences, so that—depending on the inertia or the moment of inertia of the lock pawl—it receives a movement path pointing away from the lock gear and the longer the crown circle diameter is lifted off.

The tooth head may have a projection on both sides in the circumferential direction. In this way, a locking effect can be achieved regardless of the direction of rotation of the lock gear, so that the lock gear can be locked during a rotation to realize a forward movement as well as during a rotation to realize a reverse movement.

In an embodiment of the lock gear according to the disclosure with the projections described above, the two movements of the lock pawl each have an acceleration directed radially outwardly away from the lock gear each time it leaves the projection of a respective lock gear tooth. Such movement of the lock pawl can be viewed as an upward movement followed by a downward movement. The movement paths occurring here have a substantially longer path until the locking pawl dips than for a locking pawl that does not travel over a projection due to the additional projection radially outwardly depending on the rotational speed of the lock gear.

Accordingly, a parking lock device according to the disclosure with a lock gear with projections can have a comparatively lower deflection speed due to the movement paths of the lock pawl that are influenced by the projections and consequently the contour following element coupled therewith, which furthermore increases the likelihood of the lock pawl dipping incorrectly into a tooth gap and an associated disadvantageous ejection of the lock pawl from the tooth gap can be further reduced.

In addition, a drive arrangement for a motor vehicle may be provided, including a transmission and a parking lock device according to the disclosure. The parking lock device has an output shaft of a transmission, and the parking lock gear is connected to the output shaft in a torque-proof manner or is formed thereby. Thus, the parking lock device is coupled to an output side of the drive arrangement, so that when the lock gear is locked, the output is blocked and the parking lock is consequently activated.

BRIEF DESCRIPTION OF THE DRAWINGS

The disclosure described above is explained in detail below based on the relevant technical background with reference to the associated drawings, which show example embodiments. The disclosure is in no way restricted by the purely schematic drawings, although it should be noted that the embodiments shown in the drawings are not limited to the dimensions shown. In the figures.

DETAILED DESCRIPTION

Figure 1:
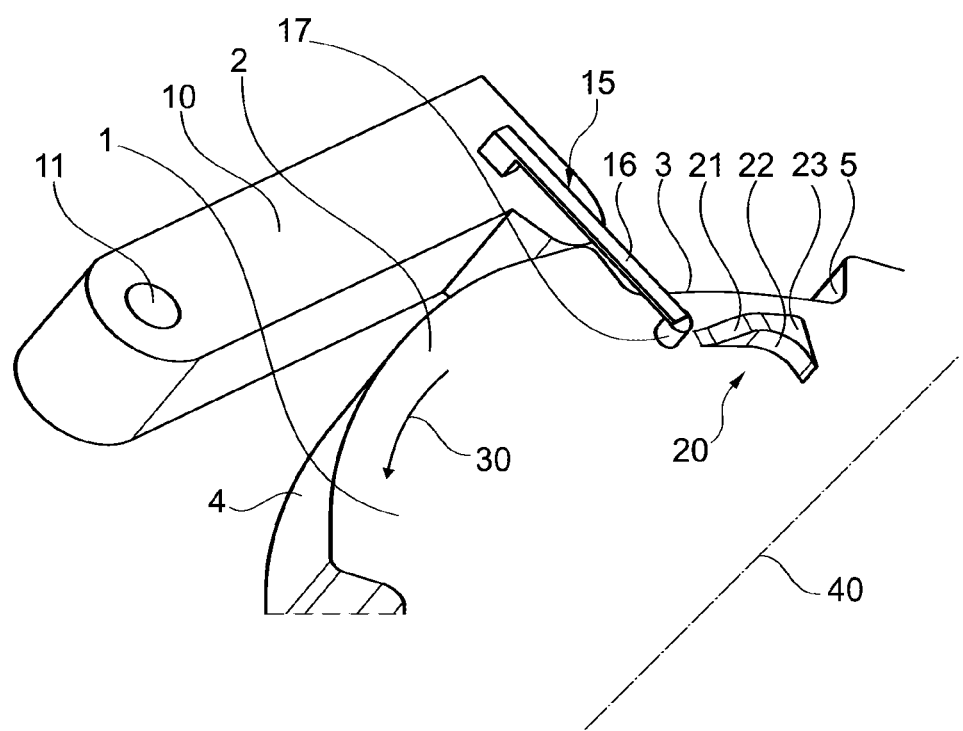
FIG. 1 shows a perspective view of the parking lock device.

First, the general structure of the parking lock device according to the disclosure is described with reference to FIG. 1.

The parking lock device includes a lock gear 1 that is rotatably mounted about a rotational axis 40 as shown. The lock gear 1 rotates in the direction of rotation 30 and thus counterclockwise in the direction of rotation shown here. In the circumferential direction of the lock gear 1, an external toothing with a plurality of teeth 2 distributed on the circumference is provided. The lock gear 1 has tooth gaps 3 between the teeth 2.

The lock pawl 10, which extends in the direction of rotation of the lock gear 1, is also shown in FIG. 1. The lock pawl 10 includes, at the end thereof, aligned in the direction of rotation 30, a lock pawl bearing 11 in which the lock pawl 10 is rotatably mounted. The rotational axis of the lock pawl bearing 11 extends essentially parallel to the rotational axis 40 of the lock gear 1.

The control element 20 and the contour following element 15 are also shown. The contour following element 15 is mechanically connected to the lock pawl 10 via the connecting element 16. This connection is formed on the end of the lock pawl 10 facing away from the lock pawl bearing 11 in such a way that the contour following element 15 extends radially inwardly to the lock gear 1. At the radially inward end of the contour following element 15, this forms a driving element 17, which is designed as a cylindrical extension in the direction of the plane of the extent of the lock gear 1.

The control element 20 is formed on the lock gear 1 and includes the control ramp 21, the control contour 22 and the control platform 23. The control ramp 21 is designed such that the longitudinal direction of extension thereof is parallel to a tangent to an ideal circle coaxial to the rotational axis. With the extension thereof in the longitudinal direction of extension, it increasingly moves away from the plane of extension of the parking lock gear 1. The control platform 23 forms a surface which lies parallel to the plane of extent of the parking lock gear 1, wherein it adjoins the control ramp 21 at the end of the longitudinal direction of extent.

The control contour 22 is part of the control element 20 such that it is regarded as a radially inner side wall of the control ramp 21 and the control platform 23. The radial contour thereof increasingly moves away from the parking lock pawl 10 counter to the direction of rotation 30 of the lock gear 1. When the lock pawl 10 bears against a tooth head 4, the driving element 17 bears against a circular path about the rotational axis 40 of the lock gear 1. The control ramp 21 and the control platform 23 also extend along this circular path. This ensures that the lock pawl 10 and thus indirectly the contour following element 15, as well as the driving element 17, passes over the control ramp 21 and the control platform 23 when the lock gear 1 rotates when leaving a tooth head 4 in the event of a speed above the deflection speed and therefore cannot be detected by the control contour 22.

Figure 2:
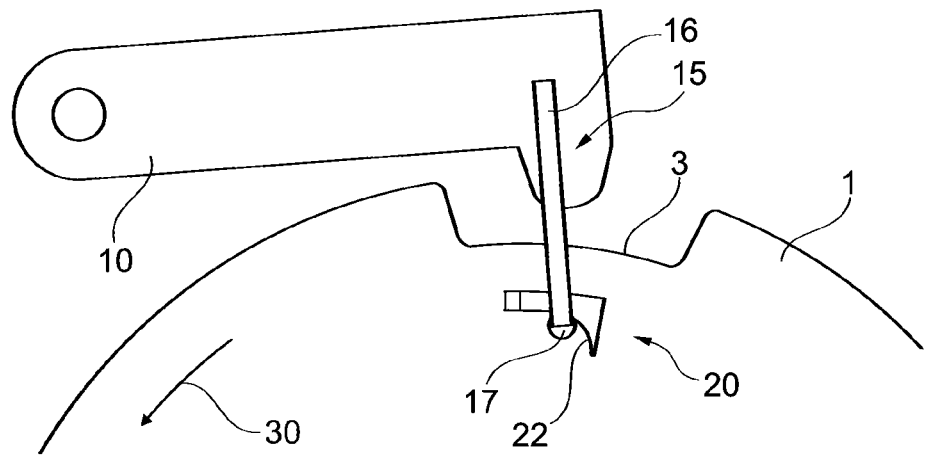
FIG. 2 shows a side view of the parking lock device at the start of locking the lock gear 1 by the lock pawl 10.
Figure 3:
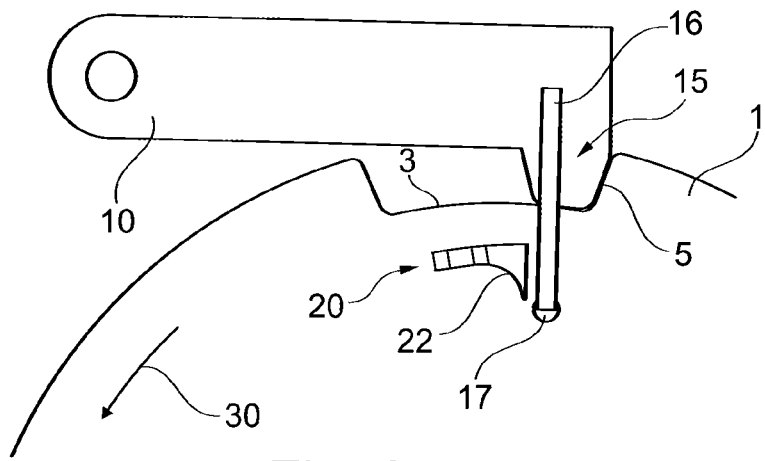
FIG. 3 shows a side view of the parking lock device at the end of locking the lock gear 1 by the lock pawl 10.
Figure 4:
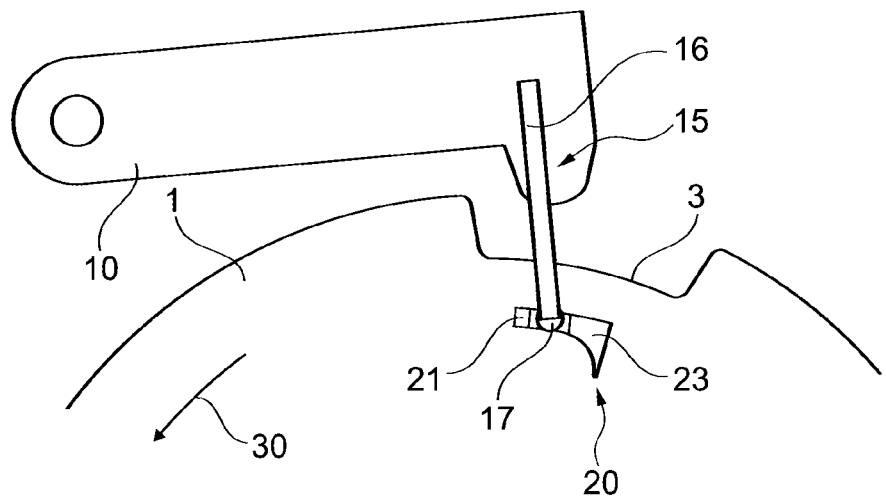
FIG. 4 shows a side view of the parking lock device at the start of jumping over a tooth gap 3 by the lock pawl 10.
Figure 5:
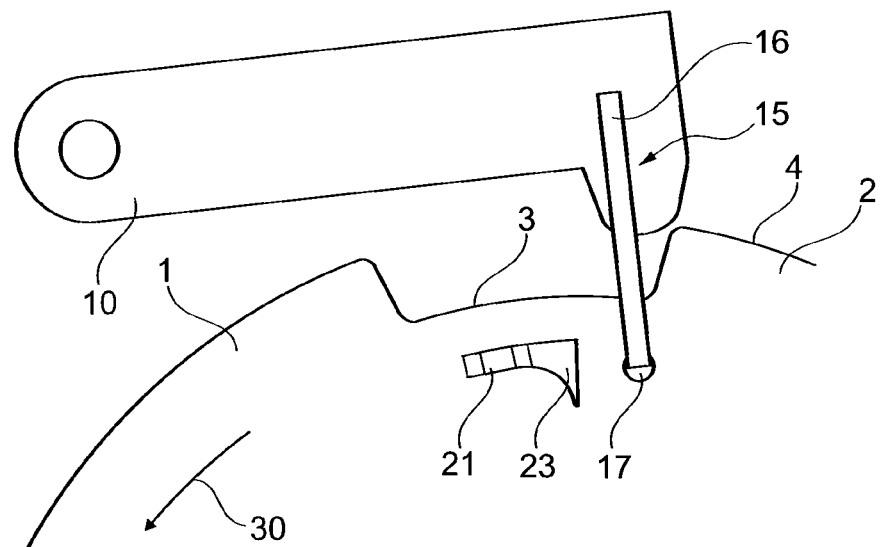
FIG. 5 shows a side view of the parking lock device at the end of jumping over a tooth gap 3 by the lock pawl 10.

Building on the description of the components of the disclosure in FIG. 1, FIGS. 2 and 3 show the parking lock device when locking the lock gear 1 by the lock pawl 10 and FIGS. 4 and 5 show the parking lock device when a tooth gap 3 is jumped over by the lock pawl 10.

In the embodiment variant of the device according to the disclosure shown in FIG. 2, the lock pawl 10 is shown on a first movement path at a realized rotational speed of the lock gear 1 below the deflection speed.

The driving element 17 of the contour following element 15 is thus placed on the control contour 22 of the control element 20. The lock pawl 10 is shown here during the process of forcing into a tooth gap 3. With the further rotation of the lock gear 1 in the direction of rotation 30, the driving element 17 and thus indirectly the lock pawl 10 is guided through the contour following element 15 along the control contour 22. The rotation of the lock gear 1 in the direction of rotation 30 now forces the driving element 17 along the control contour 22 radially inwardly, in that the driving element 17 increasingly follows the section of the contour of the control contour 22 running radially inwardly at least in regions in the direction of the rotational axis 40. The lock pawl 10 is thus deflected from the actual course thereof and pulled into the tooth gap 3.

In addition to FIG. 2, FIG. 3 shows the position of the lock pawl 10 after the forcing. The driving element 17 has left the bearing on the control contour 22 and is now located radially further inward than the end of the control contour 22. The lock pawl 10 is completely dipped and is in a tooth gap 3 on the tooth flank 5. The lock gear 1 is locked.

In the embodiment variant of the device according to the disclosure shown in FIG. 4, the lock pawl 10 is shown on a second movement path at a realized rotational speed of the lock gear 1 at or above the deflection speed.

The driving element 17 of the contour following element 15 bears against the control ramp 21 of the control element 20. The lock pawl 10 is shown here during the process of jumping over a tooth gap 3. The driving element 17 first passes over the control ramp 21. The driving element 17 is moved in the axial direction away from the surface of the lock gear, as a result of which the spring-formed connecting element 16 is tensioned. With further rotation of the lock gear 1 in the direction of rotation 30, the driving element 17 moves off the control ramp 21 and subsequently passes over the control platform 23, wherein the tension in the suspension of the connecting element 16 is retained over the entire path of the control platform 23. The lock pawl 10 moves unaffected on a second movement path and does not experience any radially acting forces that affect the movement thereof.

In addition to FIG. 4, FIG. 5 describes the position of the lock pawl 10 after the driving element 17 has passed over the control ramp 21 and the control platform 23. The driving element 17 again no longer bears against the control platform 23, as a result of which the tension of the suspension of the connecting element 16 brings it back into the original orientation thereof. The lock pawl 10 has thus jumped over the tooth gap 3 of the unaffected movement thereof and lands on the subsequent lock tooth 2, namely on the subsequent tooth head 4. The lock gear 1 is not locked and the lock pawl 10 does not need to be rejected from a partially dipped position.

With the parking lock device proposed here, a device is provided that ensures that the parking lock pawl can only dip into a tooth gap of the parking lock gear if a defined rotational speed of a rotating element in the drive train is undershot, whereby the parking lock pawl is prevented from being ejected from a partially dipped position, which extends the service life and reduces noise emissions.

REFERENCE NUMERALS

1 Lock gear
2 Lock gear tooth
3 Tooth gap
4 Tooth head
5 Tooth flank
10 Lock pawl
11 Lock pawl bearing
15 Contour following element
16 Connecting element
17 Driving element
20 Control element
21 Control ramp
22 Control contour
23 Control platform
30 Direction of rotation of the lock gear
40 Rotational axis of the lock gear

The invention claimed is:

1. A parking lock device for a motor vehicle, comprising:
a rotational axis;
a parking lock gear, rotatable about the rotational axis, comprising:
an external toothing with a plurality of radially extending teeth and a plurality of tooth gaps lying between respective pairs of the radially extending teeth;
a parking lock pawl comprising a portion arranged for radially engaging into a one of the plurality of tooth gaps for blocking rotational movement of the parking lock gear;
a first control contour that is mechanically connected to or an integral component of the parking lock gear, comprising a section extending in a first rotational direction of the parking lock gear in a manner which differs from a circular path coaxial to the rotational axis to a side radially away from the parking lock pawl; and
a first contour following element for bearing against the first control contour, mechanically connected to the parking lock pawl, wherein, during relative rotational movement between the parking lock gear and the parking lock pawl, the first contour following element rotates relative to the first control contour and the first contour following element bears against the first control contour, forcing the first contour following element to move the parking lock pawl with a radially inwardly directed movement component, deeply engaging the parking lock pawl in the one of the plurality of tooth gaps.

2. The parking lock device of claim 1, wherein the first contour following element is connected to the parking lock pawl with a connecting element.

3. The parking lock device of claim 2, wherein the connecting element is resiliently arranged on the parking lock pawl.

4. The parking lock device of claim 1, further comprising a control ramp disposed upstream in the first rotational direction extending in an axial direction, wherein the first contour following element is axially spring-mounted and arranged to be axially displaceable by the control ramp.

5. The parking lock device of claim 1, wherein the parking lock pawl is rotatably mounted.

6. The parking lock device of claim 1, wherein:
the first control contour is part of a control element that further comprises a control ramp; and
the control ramp is traversable by the first contour following element such that a movement path of the parking lock pawl has an unaffected course along an outer surface of the plurality of radially extending teeth allowing the parking lock pawl to jump over the one of the plurality of tooth gaps onto a subsequent tooth head.

7. A drive arrangement for a motor vehicle, comprising:
a transmission comprising a transmission element; and
the parking lock device of claim 1 connected to the transmission element in a torque-proof manner or formed by the transmission element.

* * * * *